United States Patent [19]
Moireau

[11] Patent Number: 6,090,487
[45] Date of Patent: Jul. 18, 2000

[54] SIZING COMPOSITION FOR GLASS THREADS, PROCESS USING THIS COMPOSITION AND RESULTING PRODUCTS

[75] Inventor: Patrick Moireau, Curienne, France

[73] Assignee: Vetrotex France, Chambery, France

[21] Appl. No.: 09/210,734

[22] Filed: Dec. 15, 1998

Related U.S. Application Data

[62] Division of application No. 08/687,437, filed as application No. PCT/FR95/01640, Dec. 11, 1995.

[30] Foreign Application Priority Data

Dec. 13, 1994 [FR] France .................................. 94 14353

[51] Int. Cl.[7] ..................................................... D02G 3/00
[52] U.S. Cl. .......................... 428/375; 428/378; 428/413; 428/441; 522/170; 522/181; 522/182; 522/31
[58] Field of Search ..................................... 428/375, 377, 428/378, 392, 413, 441; 65/443, 447; 522/170, 181, 182, 31

[56] References Cited

U.S. PATENT DOCUMENTS

| | | | |
|---|---|---|---|
| 4,244,844 | 1/1981 | Molinier et al. ............................ | 260/9 |
| 4,668,757 | 5/1987 | Nichols ..................................... | 528/88 |
| 5,011,523 | 4/1991 | Roncato et al. ............................ | 65/2 |
| 5,049,407 | 9/1991 | Soszka et al. ........................... | 427/54.1 |
| 5,057,358 | 10/1991 | Riding et al. ............................ | 428/209 |
| 5,171,634 | 12/1992 | Soszka et al. ........................... | 428/376 |
| 5,352,392 | 10/1994 | Johnson et al. ............................ | 264/22 |
| 5,363,468 | 11/1994 | Yoshikawa et al. ...................... | 385/145 |
| 5,364,945 | 11/1994 | Cai et al. ................................. | 549/253 |
| 5,498,763 | 3/1996 | McGarry et al. ......................... | 428/229 |
| 5,539,012 | 7/1996 | Klemarczyk et al. ..................... | 522/13 |
| 5,611,836 | 3/1997 | Moireau .................................... | 65/453 |
| 5,703,249 | 12/1997 | Rheinberger et al. ................... | 549/337 |
| 5,804,313 | 9/1998 | Schell ...................................... | 428/391 |

FOREIGN PATENT DOCUMENTS

| | | | |
|---|---|---|---|
| 2 713 625 | 6/1995 | France ........................... | C03C 25/02 |

*Primary Examiner*—William Krynski
*Assistant Examiner*—Betelhem Shewareged
*Attorney, Agent, or Firm*—Oblon, Spivak, McClelland, Maier & Neustadt, P.C.

[57] ABSTRACT

The present invention relates to a sizing composition for glass threads which comprises a solution of a viscosity of less than or equal to 400 cP containing less than 5% by weight of solvent and containing at least one base system which can be polymerised under the action of ultraviolet radiation or an electron beam, the said base system comprising at least one component that has a molecular mass of less than 750 and that has at least one reactive epoxy group and comprising at least 60% by weight of one or more components that have a molecular mass of less than 750 and that have at least one reactive group selected from the following groups: epoxy, hydroxy, vinyl ether, acrylic and methacrylic.

The invention relates also to a process using this composition and to the threads coated with the said composition.

2 Claims, No Drawings

SIZING COMPOSITION FOR GLASS THREADS, PROCESS USING THIS COMPOSITION AND RESULTING PRODUCTS

This application is a division of application Ser. No. 08/687,437, filed Oct. 10, 1996, which is a 371 of PCT/FR95/01640 filed Dec. 11, 1995.

The present invention relates to a sizing composition for glass threads, this composition reacting to ultraviolet radiation or to an electron beam. The present invention relates also to a process for the production of reinforcing glass threads using this composition, and also to the glass threads obtained and the composites produced starting from the threads.

In the course of the text, "polymerisable", "polymerise", and "polymerisation" are to be understood as meaning, respectively, "polymerisable and/or crosslinkable", "polymerise and/or crosslink", and "polymerization and/or crosslinking". Likewise, "under U.V. or E.B." and "U.V. irradiation or E.B. exposure" are to be understood as meaning, respectively, "under the action of ultraviolet radiation or of an electron beam" and "irradiation by ultraviolet radiation or exposure to an electron beam".

The manufacture of reinforcing glass threads is effected in known manner starting from thin streams of molten glass flowing from the orifices of die plates. These thin streams are drawn in the form of continuous filaments and then the filaments are gathered into basic threads which are subsequently collected.

Before they are gathered in the form of threads, the filaments are coated with a size by being passed over a sizing member. The depositing of size is necessary in order to obtain the threads and enables the threads to be associated with other organic and/or inorganic materials in order to produce composites.

The size acts primarily as a lubricant and protects the threads from the abrasion resulting from the high-speed friction of the threads on various members during the above-mentioned process.

The size can also ensure, especially after polymerisation, the integrity of the above-mentioned threads, that is to say, the interconnection of the filaments within the threads. This integrity is especially desired in textile applications where the threads are subjected to great mechanical stresses. If the filaments are poorly integral with one another they break more easily and interfere with the operation of the textile machines. In addition, threads that do not exhibit integrity are considered to be difficult to handle.

The size also facilitates the wetting and/or impregnation of the threads with the materials to be reinforced and contributes to the creation of bonds between the said threads and materials. In particular, the mechanical properties of the composites obtained from the said materials and threads depend on the quality of the adhesion of the material to the threads and on the suitability of the threads for being wetted and/or impregnated by the material.

The sizing compositions used have to be sufficiently stable, especially under the die plate, and compatible with the drawing steeds of the filaments that have to pass through them (up to several tons of meters per second). In particular, they must be able to withstand the shearing induced by the passage of the filaments and must wet the surface of the filaments at the said speeds. It is also desirable for these compositions to exhibit a maximum degree of conversion after polymerisation (this degree corresponding to the ratio between the number of reactive groups that have reacted in the size after polymerisation and the number, in the size, of reactive groups that are capable of reacting, before polymerisation) in order to ensure, in particular, that glass threads having a constant quality are obtained (a size exhibiting a degree of conversion much lower than the expected theoretical degree being capable of changing over time).

The majority of sizes currently used are aqueous sizes which are easy to handle but which have to be deposited on the filaments in large quantities in order to be effective. Water generally constitutes 90% by weight of these sizes (in particular for reasons of viscosity), which makes it necessary to dry the threads before they are used as reinforcements, since the water may impair the good adhesion between the threads and the materials to be reinforced. These drying operations are long and expensive, have to be adapted to the manufacturing conditions of the threads and their efficacy is not always optimum. In addition, when they are carried out on rolls of threads, they entail the risk of irregular and/or selective migration of the components of the size within the rolls (aqueous sizes already having a tendency to spread over the threads in an irregular manner, owing to their nature) and, in certain cases, the phenomena of the threads' becoming coloured or the rolls' being deformed. The deformation of the rolls is also observed, in the absence of drying, on straight-edged rolls (rovings) of "fine" threads (that is to say, threads having a "titre" or "linear mass" of from 300 to 600 tex (g/km) or less) coated with aqueous sizes.

A few patents describe non-aqueous sizes, but these sizes generally use organic solvents which are tricky to handle and may impair the health of persons in the vicinity because they are toxic, and/or pose viscosity problems which are solved by heating the sizes or by adding suitable agents.

Patent EP-B1 243 275 describes a size comprising at least one mono- or poly-unsaturated oligomer and a photo-initiator (of the free radical type), which size reacts to ultraviolet radiation and is used in a particular process. According to this process, the size is deposited on the filaments before they are gathered into threads, and then the threads are subjected to ultraviolet radiation, before being wound, in such a manner as to polymerise the size and prevent adhesion between the turns of each roll, which would make it difficult to unwind the threads. Such a process results in threads that exhibit integrity and that can be handled directly. However, the polymerised size prevents the filaments from sliding relative to one another, this lack of mobility causing the threads to burst when cut owing to the mechanical degradation of the size and possibly creating problems in textile applications where the threads used have to exhibit both integrity and pliability (the pliability of the threads being linked with the pliability of the size and the amount of size deposited). In addition, the loss on ignition of the threads obtained is rather high and the degree of conversion after polymerization hardly exceeds 75%.

Another size (based on acrylates, N-vinylpyrrolidone and a free radical photo-initiator) reacting to ultraviolet radiation is mentioned in patent EP 570 283 which describes a process in which the irradiation of the threads is carried out on rolls of thread during the winding operation. The glass threads obtained exhibit good mechanical characteristics, a satisfactory degree of conversion owing to the longer irradiation time and a low loss on ignition, but their integrity is not entirely satisfactory. However, it seems hardly economical to increase the amount of size deposited on the threads (therefore lose on ignition) in order to improve integrity and that could result in sized threads having too high a degree of rigidity.

The present invention relates to an improved sizing composition for glass threads, which composition makes the threads easy to handle and imparts to them a pliability compatible with their later treatments, which composition imparts a good integrity to the threads after polymerisation with a low loss on ignition and exhibits a satisfactory degree of conversion, which composition also protects the threads effectively against abrasion and enables them to be associated with various materials to be reinforced, with a view to producing composite parts having good mechanical properties, is particularly stable, especially under the die plate, and is compatible with the drawing speeds of the filaments.

The present invention relates also to an improved process for the manufacture of reinforcing glass threads and also to improved glass threads which are easy to handle and are suitable for the effective reinforcement of organic and/or inorganic materials for the manufacture of composites.

The sizing composition according to the invention comprises a solution of a viscosity of less than or equal to 400 cP (0.4 Pa·s) containing less than 5% by weight of solvent and containing at least one base system which can be polymerized under U.V. or E.B., the said base system comprising at least one component that has a molecular mass of less than 750 and that has at least one reactive epoxy group and comprising at least 60% by weight of one or more components that have a molecular mass of less than 750 and that have at least one reactive group selected from the following groups: epoxy, hydroxy, vinyl ether, acrylic and methacrylic.

The invention relates also to a process for the production of sized glass threads wherein a plurality of thin streams of molten glass flowing from a plurality of orifices arranged at the base of one or more die plates are drawn in the form of one or more fans of continuous filaments, and the filaments are then gathered into one or more threads which are collected on a moving support, the said process consisting in depositing the sizing composition defined above on the surface of the filaments in the course of the drawing operation and before the filaments are gathered into threads.

The invention relates also to threads that are coated with a size having the composition defined above and/or that are obtained in accordance with the above-mentioned process and to the composites obtained from the said threads.

Hereinafter, "epoxy" ("hydroxy", "vinyl ether", "acrylic", "methacrylic", respectively) component(s)" are to be understood as meaning "component(s) having at least one reactive "epoxy" ("hydroxy", "vinyl ether", "acrylic", "methacrylic", respectively) group".

In the composition according to the invention, any solvents are basically organic solvents necessary for dissolving certain polymerisable compounds. The presence of these solvents in a limited amount does not require special treatments in order to eliminate them; in the majority of cases, the sizes according to the invention are, moreover, completely devoid of solvent, that is to say, of compounds acting solely as solvent in the solution.

Owing to its low viscosity (less than or equal to 400 cP and, preferably, less than or equal to 200 cP), the composition according to the invention is compatible with the conditions for obtaining glass threads imposed by the direct process, the viscosity of the composition being selected as a function of the drawing speed (generally from approximately ten to several tens of meters per second) and the diameter of the filaments (approximately between 3 and 24 micrometers) that are caused to pass through it. The composition according to the invention also has a wetting speed on the thread which is compatible with the drawing speed of the threads.

A "base system which can be polymerised under U.V. or E.B." according to the invention is to be understood as meaning the compound(s) that is (are) indispensable to the size and the main function of which is to participate in the structure of the polymerised size, these compounds being capable of polymerising under U.V. or E.B. The base system generally constitutes between 60 and 100% by weight of the sizing composition according to the invention and, preferably, between 70 and 99% by weight of the said composition.

Preferably and in general according to the invention, the component(s) having a molecular mass of less than 750 mentioned in the definition of the invention have a molecular mass of less than 500. Likewise, in the majority of cases according to the invention, and preferably, this or these component(s) are monomers (mono- or polyfunctional as will be explained hereinafter), but the base system may also comprise components having a molecular mass of less than 750 in the form of oligomers or polymers having partially polymerised groups. The base system of the composition according to the invention may comprise from 60 to 100% by weight of one or more components that have a molecular mass of less than 750 and that have one or more reactive groups from among those mentioned above.

In addition to the above-mentioned component(s) having a molecular mass of less than 750, the base system of the composition according to the invention may comprise one or more other compounds that can be polymerized under U.V. or E.B., especially one or more epoxy and/or hydroxy and/or vinyl ether and/or acrylic and/or methacrylic components having a higher molecular mass.

According to the preferred embodiment of the invention enabling especially satisfactory results to be obtained, the bass system of the composition defined according to the invention is constituted solely by one or more epoxy and/or hydroxy and/or vinyl ether and/or acrylic and/or methacrylic components, and/or is constituted solely by one or more components having a molecular mass of less than 750.

Also preferably and in general according to the invention, the base system comprises between 40 and 100% by weight and advantageously between 60 and 100% by weight of one or more epoxy components having a molecular mass of less than 750.

The epoxy and/or hydroxy and/or vinyl ether and/or acrylic and/or methacrylic component(s) that can be used in the base system may have one (monofunctional components) or more identical reactive groups (polyfunctional components) or different reactive groups from among the epoxy, hydroxy, vinyl ether, acrylic and methacrylic groups.

Preferably, in the base system, the proportion of monofunctional component(s) is between 0 and 40% by weight of the base system, the proportion of polyfunctional component (s) is between 60 and 100% by weight of the base system and the proportion of component(s) containing more than two identical reactive groups selected from those mentioned above is between 0 and 60% by weight of the base system (especially where the base system contains solely cycloaliphatic epoxy components, the proportion of components comprising more than two cycloaliphatic epoxy groups is preferably zero).

The epoxy components of the base system may be, especially, one or more of the following components: alkyl glycidyl ether or epoxy alkyl having a $C_4$–$C_{16}$ aliphatic chain; cresyl- or phenyl- or nonylphenyl- or p-tert-butylphenyl- or 2-ethylhexyl- etc . . . glycidyl ether; epoxy-cresyl; epoxy phenyl; epoxy nonylphenyl; epoxy p-tertbutylphenyl; epoxy 2-ethylhexyl; epoxy limonene; monooxycyclohexene, (the latter being a cycloaliphatic epoxide); etc . . . ; (the preceding components being monofunctional); 1,4-butanediol- or neopentyl glycol- or resorcinol- or dimethanolcyclohexane- or 1,6-hexanediol or dibromoneopentyl glycol- etc . . . diglycidyl ether;

epoxy 1,4-butanediol; epoxy neopentyl glycol; epoxy resorcinol; epoxy dimethanolcyclohexane; epoxy 1,6-hexanediol; epoxy dibromoneopentyl glycol; diepoxy derivative of bisphenols A or F; 3,4-epoxycyclohexylmethyl-3,4-epoxycyclohexanecarboxylate; bis(3,4-epoxycyclohexyl) adipate (the last two epoxides being cycloaliphatic epoxides); diepoxy polyglycol; diglycidyl ester of hexahydrophthalic anhydride; trimethylolethane- or trimethylolpropane- etc . . . triglycidyl ether; castor oil triglycidyl ether; tetra(para-glycidyloxyphenyl)ethane; polyglycidyl ether of an aliphatic polyol, epoxy-polybutadiene; epoxyphenol novolac resin, or epoxycresol novolac resin; etc . . .

The possible hydroxy components of the base system are basically selected from alcohols or polyols and may be used as flexibilisers and/or crosslinking agents (they then increase the degree of crosslinking of the size) as a function of their spatial configuration and of the number of their reactive groups.

These hydroxy components may be one or more of the following components: polyol caprolactone or its derivatives; polyol derived from ethylene glycol or from propylene glycol; ethoxylated or propoxylated trimethylolpropane; ethoxylated or propoxylated pentaerythritol; polyoxypropylene tetrol; etc . . .

Preferably, the proportion, in the base system, of component(s) having at least one reactive hydroxy group but not having a reactive epoxy group does not exceed 40% and advantageously 30% by weight of the said base system, these components being able, in particular, to retard the speed of polymerisation of the size. It is also preferable if the amount, in the base system, of epoxy component(s) is at least equal to the amount of hydroxy component(s) not having a reactive epoxy group.

The possible vinyl ether components of the base system may influence the pliability of the polymerised size. These vinyl ether components may be one or more of the following components: hydroxyalkyl vinyl ether; aliphatic or aromatic ester monomer having a vinyl ether end group, especially obtained from acids, such as adipic acid; 1,4-dimethanolcyclohexane monovinyl ether; butanediol monovinyl ether; isobutyl vinyl ether; triethylene glycol monavinyl ether; octadecyl vinyl ether; urethane alkyl vinyl ether; urethane phenyl vinyl ether etc . . . (the preceding components being monofunctional); dimethanol-cyclohexane- or triethylene glycol- or diethylene glycol- etc . . . divinyl ether; aliphatic or aromatic urethane oligomer having a vinyl ether end group; etc . . .

Preferably, the proportion, in the base system, of vinyl ether component(s) not having a reactive epoxy group does not exceed 40% by weight of the said base system.

The possible acrylic and/or methacrylic components of the base system may be one or more of the following components: n-hexyl- or cyclohexyl- or octyl- or isodecyl- or lauryl- or stearyl- or isobornyl- etc . . . acrylate or methacrylate; 2-phenoxyethyl- or benzyl- etc . . . acrylate or methacrylate; tetrahydrofurfuryl- or 2-ethoxyethyl- or 2-methoxyethyl- or 2-(2-ethoxyethoxy)ethyl- or glycidyl- or isopropyl-2-hydroxyethyl carbamate- or n-butyl-2-hydroxyethyl carbamate- or 2-hydroxyethyl oxazolidone- etc . . . acrylate or methacrylate; fluoroalkyl acrylate; etc . . . (the preceding components being monofunctional); triethylene glycol- or ethylene glycol- or tetraethylene glycol- or polyethylene glycol 200 to 600- or 1,3-butylene glycol- or 1,4-butanediol- or diethylene glycol- or 1,6-hexanediol- or neopentyl glycol- or ethoxylated bisphenol A- or diethyl carbonate- etc . . . diacrylate or dimethacrylate; diacrylate or dimethacrylate diol having a $C_{14}$–$C_{15}$ aliphatic chain, which may or may not be alkoxylated; tris(2-hydroxyethyl isocyanurate)- or pentaerythritol- or trimethylolpropane-etc . . . triacrylate or trimethacrylate; pentaerythritol- or ditrimethylolpropane- etc . . . tetraacrylate or tetramethacrylate; dipentaerythritol- etc . . . pentaacrylate or pentamethacrylate, tetrabromobisphenol-A diacrylate; etc . . .

The above-mentioned components may be classified in two categories: components of which the polymerization is carried out by the cationic method, that is to say, epoxy and/or hydroxy and/or vinyl ether components; and components of which the polymerisation is carried out by the free radical method, that is to say, especially acrylic and/or nethacrylic components. In general, the compositions according to the invention containing both components that can be polymerised by the cationic method and components that can be polymerised by the free radical method are more pliable after polymerisation (but also confer a slightly lower degree of integrity on the threads) than are compositions containing solely components that can be polymerised by the cationic method. The former compositions are more suited to coating threads intended for textile applications while the latter compositions are principally suitable for coating threads that are to be cut. Advantageously, according to the invention, the proportion of component(s) of the base system that can undergo polymerisation by the free radical method is less than 60% by weight of the base system and, preferably, less than 40% by weight of the base system.

According to the preferred embodiment of the invention, the sizing composition comprises, in addition to the base system, at least one cationic photo-initiator permitting the polymerisation of the size by U.V. irradiation or E.B. exposure. The cationic photo-initiator(s) that can be used in the sizing composition according to the invention may be one or more of the following components: a diazonium salt such as aryldiazonium tetrafluoroborate; a diaryliodonium salt such as diaryliodonium hexafluoroarsenate; a triarylsulphonium salt such as triarylsulphonium hexafluoroantimonate; triarylsulphonium hexafluorophosphate; triarylsulphonium hexafluoroarsenate; a triarylselenium salt; a dialkylphenacylsulphonium salt; a ferrocenium salt; alpha-sulphonyloxy ketone; silyl benzyl ether etc . . . and are preferably triarylsulphonium salts. These photo-initiators are, in general, associated with compounds optionally acting as solvents, such as propylene carbonate or gamma-butyrolactone. Preferably, the amount of cationic photo-initiator(s) present in the sizing composition or introduced into the said composition in order to permit good polymerisation is between 1 and 5% by weight of the said composition.

Under U.V. or E.B., the cationic photo-initiator(s) release cationic species which induce polymerisation of the epoxy component(s) and, where appropriate, of the hydroxy and/or vinyl ether components, and, optionally, release free radicals inducing, where appropriate, polymerisation of the acrylic and/or methacrylic component(s).

In addition to a cationic photo-initiator, the sizing composition according to the invention may contain, in the particular case where the said composition comprises at least one component that can be polymerised by the free radical method, at least one free radical photo-initiator, especially when the cationic photo-initiator used does not release free radicals and/or when the amount of compounds reacting by the free radical method exceeds approximately 40% by weight of the total of the compounds that can be polymerised under U.V. or E.B., the presence of this free radical photo-initiator, however, not being indispensable. The free radical photo-initiator may consist especially in one or more aromatic ketones such as 2-hydroxy-2-methyl-1-phenylpropane-1-one, 1-hydroxycyclohexyl phenyl ketone, etc . . . Its amount is proportional to the amount of compounds that can be polymerized by the free radical method and that are present in the size and does not exceed 8% by weight of the total of the said compounds.

Apart from the base system and, where appropriate, the photo-initiator(s), the sizing composition according to the invention may comprise small amounts of additives, these additives conferring special properties on the sizing composition but basically not being involved in the structure of the size, unlike the base system. Even though these additives are to be distinguished from the base system, they may nevertheless be polymerisable under U.V. or E.B. like the compounds of the base system.

The composition according to the invention may especially comprise as additive(s) at least one coupling agent enabling the size to be coupled to the glass, the proportion of coupling agent(s) in the size being between 0 and 15% by weight of the size. This or these coupling agent(s) preferably have a molecular mass of less than 500 and do not carry primary or secondary amine groups, which groups may, especially, neutralise the cationic species (for example Lewis acids) freed by the cationic photo-initiators. The coupling agents may be one or more of the following components: gamma-glycidyloxy-propyltrimethoxysilane; gamma-methacryl-oxypropyltrimethoxysilane; polyethoxypropoxytrimethoxysilane; gamma-acryloxypropyltrimethoxysilane, vinyltrimethoxysilane; etc . . . (the preceding components being silanes); titanate; zirconate; siloxane, etc . . .

The composition according to the invention may also comprise as additive(s) at least one film-forming agent acting solely as a sliding agent and facilitating fiber-forming, in proportions between 0 and 15% by weight and preferably between 0 and 10% by weight. The presence of film-forming agent(s) prevents any major friction between the filaments and the sizing device when the filaments are very fine and/or drawn at high speed (more than 40 m/s), these agents being, however, expensive and possibly entailing a reduction in the mechanical characteristics of the composites. The fiber-forming agents may be one or more of the following components: silicone; siloxane with or without an epoxy group; silicone derivative, such as silicone oil, polysiloxans, such as glycidyl(n)polydimethylsiloxane or alpha, omega-acryloxypolydimethylsiloxane, etc . . .

The composition according to the invention may also comprise as additive(s) at least one textile application agent acting basically as a lubricant, in proportions between 0 and 10% by weight and, preferably, between 0 and 5% by weight. The textile agents may be one or more of the following components: fatty ester (optionally ethoxylated or propoxylated) or glycol derivative (especially ethylene or propylene glycol derivative), such as ethylene glycol adipate, isopropyl or cetyl palmitate, isobutyl or isopropyl stearate, decyl laurate, a polyethylene glycol or polypropylene glycol having a molecular weight of less than 2000, etc . . .

The size may also comprise as additive(s) at least one agent for adaptation to the materials to be reinforced, especially in the case of cementing materials.

The sizing composition according to the invention protects the threads from abrasion in an effective manner, is stable, especially under the die plate, is compatible with the drawing speeds of the filaments and does not necessitate a drying operation. The stability of the sizing composition may be increased when the composition does not contain a cationic photo-initiator. Thus, it may be advantageous to use a composition according to the invention that does not contain a cationic photo-initiator and not to introduce the photo-initiator(s) into the said composition until the sized threads are ready to be subjected to ultraviolet radiation or to an electron beam with a view to polymerising the size, When the composition according to the invention is deposited on the filaments as they are being drawn, it spreads very rapidly over their entire surface and forms a proper protective film for each of them. The thread obtained by gathering the filaments and coated with the composition which has not yet been polymerised thus comprises a bundle of sheathed filaments which can slide on one another, the thread then exhibiting a substantial degree of pliability, which is especially advantageous where the thread is to be cut, the sheathing of the filaments also offering extra protection against abrasion.

Such a thread does not exhibit an integrity in the normal sense of the term, that is to say, it is not composed of filaments which are fixed to one another owing, in particular, to an adhesive bond brought about by one or more constituents of the size, such as may be brought about by adhesive film-forming agents present in a size in a substantial quantity. Despite that, the thread coated with the composition which has not yet been polymerised is easy to handle and, when it is wound in the form of rolls, is readily extracted from the rolls without undergoing a prior size polymerisation treatment. The threads coated with the sizing composition which has not yet been polymerised are also extremely suitable for wetting and impregnation by materials to be reinforced, more rapid impregnation permitting an increase in productivity and the composites obtained having a more homogeneous appearance and some improved mechanical properties.

The integrity proper of the threads, which is obtained by the adhesion of the filaments of which they are composed, is obtained after polymerisation of the sizing composition by U.V. irradiation or E.B. exposure. This integrity is desirable for threads that have to be subjected to a high degree of mechanical stress during use (textile applications) or for cut threads which are to reinforce organic and/or inorganic materials. In such cases it is preferable to carry out the polymerisation of the size before using the threads in textile applications or before the cut threads are associated with a material to be reinforced, respectively.

The integrity obtained after polymerising the size is substantial, whilst the amount of polymerised size on the threads is relatively low (the loss on ignition of the threads coated with the sizing composition and/or obtained in accordance with the process of the invention not exceeding 3% by weight). The amount of sizing composition that has to be deposited on the threads in order to be effective is advantageously very small and results in threads that have very good characteristics, including integrity. This integrity, with a low loss on ignition, obtained by using a composition according to the invention comprising at least one cationic photo-initiator is superior to the integrity obtained under the some conditions with the majority of the conventional sizing compositions reacting under U.V. or E.B. and especially with a composition such as that described in patent EP 570 283. By way of indication, the integrity obtained for a loss on ignition of 1% with the sizing compositions according to the invention comprising (or into which has been introduced) at least one cationic photo-initiator corresponds to an integrity obtained for a loss on ignition of 2.5% with a composition that is similar but contains solely components reacting by the free radical method and free radical photo-initiators.

The sizing composition according to the invention also has, after polymerisation, a degree of conversion closer to the expected theoretical degree than that obtained under the same conditions for conventional sizes reacting under U.V. or E.B. In conventional sizes, especially sizes containing compounds that can be polymerised by the free radical method and free radical photo-initiators, polymerisation ceases at the end of U.V. irradiation or E.B. exposure because of the consumption of the free radicals formed. In the sizing composition according to the invention, the Lewis acids resulting from the decomposition of the photo-initiator are retained and enable polymerization to be continued. Preferably, the sized threads according to the invention are subjected to a maturing phase after polymerisation in order to obtain a satisfactory degree of conversion.

The threads may advantageously be associated with various materials to be reinforced with a view to producing composite parts exhibiting good mechanical properties. The composition according to the invention confers on the threads a good compatibility with the materials to be reinforced, especially with organic materials and, in particular, with epoxy materials, but also with mineral materials, such as cementing materials. It also permits the impregnation of the sized threads by the material to be reinforced. The composition is especially suitable for the production of continuous threads collected in the form of rovings, cakes, cops, mats . . . , or for the production of cut threads, these various threads being composed of filaments having a diameter which can range from 3 to approximately 24 microns. The sizing composition according to the invention is especially suitable for the production of fine threads (having a titre of especially from 68 to 136 tex) collected in the form of rovings, unlike the conventional aqueous sizes.

The sizing composition according to the invention is advantageously deposited in the course of the process according to the invention on filaments which are to be gathered into threads and in then polymerised under U.V. or E.B., it being possible to carry out the U.V. irradiation or E.B. exposure at various stages of the process. The irradiation or exposure may especially be carried out during the direct process for the production of threads after depositing the size on the filaments and before collecting the sized threads. The irradiation or exposure may also be carried out during the collection of the sized threads, and equally after the collecting operation, before or simultaneously with the production of a composite by associating the sized threads with an organic material.

Preferably, the irradiation or exposure is carried out in the presence of at least one cationic photo-initiator, this photo-initiator already being present in the sizing-composition as deposited on the filaments and/or being introduced into the said composition later before U.V. irradiation or E.B. exposure, especially by means of a material (for example a binder or a material to be reinforced) associated with the sized glass threads.

If the sizing composition deposited on the filaments according to the process of the invention comprises at least one cationic photo-initiator, the U.V. irradiation or E.B. exposure can be carried out on the sized filaments or on the sized threads on a portion of their path before collection, on the model of the processes described in patents U.S. Pat. No. 4,042,360 and EP 243 275, respectively. If the threads are collected in the form of rolls, the U.V. irradiation may also be carried out on the rolls during the winding operation on the model of the process described in patent EP 570 283. The U.V. irradiation or E.B. exposure before collection of the threads and/or on the rolls of sized threads is especially preferred where the threads are intended for textile applications.

The threads obtained after gathering the filaments may not only be collected in the form of rolls on a rotating support but may also be collected on receiving supports moving in translation. In particular, the threads can be projected, by a member which is also used to draw them, towards the collecting surface moving transversely to the direction of the projected threads in order to obtain a sheet of intermingled continuous threads known as a "mat", in which case the U.V. irradiation or E.B. exposure can be carried out not only before collection as described above (the size deposited on the filaments then comprising at least one cationic photo-initiator) but also during collection, on the threads spread over the collecting surface. Where appropriate, a binder (which may optionally comprise and introduce into the size a cationic photo-initiator) may have been projected onto the mat before U.V. irradiation or E.B. exposure, and the irradiation or exposure may permit polymerization of both the binder and the size.

The threads may also be cut before collection by a member which is also used to draw them, the cut threads being collected on receiving supports moving in translation, in which case the U.V. irradiation or E.B. exposure is preferably carried out on the cut threads (the size deposited on the filaments in that case advantageously comprising at least one cationic photo-initiator), for example, between the cutting member and the receiving support and/or on the receiving support and/or between a first receiving support and a second receiving support . . .

The threads may also be collected without having been subjected to ultraviolet radiation or exposed to an electron beam, the U.V. irradiation or E.B. exposure being carried out later. In particular, the threads may be collected in the form of rolls, and may then be extracted from the rolls in order to undergo supplementary treatments (for example, in order to be cut by a member which also serves to entrain them mechanically), it being possible to carry out the irradiation or exposure on the threads before, during or after the supplementary treatment(s) (especially in the case of cutting, the irradiation or exposure can be carried out between the cutting member and the member for collecting the cut threads or on the collecting member . . . ).

The threads may also be collected without having been subjected to ultraviolet radiation or exposed to an electron beam, and may then be irradiated or exposed after being associated with an organic material during the production of a composite, the said material optionally comprising at least one cationic photo-initiator. Depending on the organic material used, the U.V. irradiation or E.B. exposure may be accompanied by a thermal treatment or another treatment by actinic radiation, etc.

The U.V. irradiation or E.B. exposure can also be carried out after associating the sized glass threads and an organic material in the following manner: after drawing, the glass filaments are coated with the sizing composition according to the invention and gathered into threads while, at the same time, a thermoplastic organic material is extruded and entrained, the paths followed by the glass threads and the organic material converging towards one another before the said material and the said threads are gathered into at least one composite thread or ribbon, the said composite thread or ribbon being subjected to ultraviolet radiation or exposed to an electron beam on a portion of its path before collection. This process for manufacturing a composite thread or ribbon is effected, for example, on the model of the process described in patent EP 0 367 661.

The glass threads coated with the size according to the invention and/or obtained in accordance with the process of the invention are coated with a non-polymerised size or with a size polymerised following U.V. irradiation or E.B. exposure.

These threads are easy to handle and exhibit, after polymerisation, improved characteristics of integrity and an improved degree of size conversion. Surprisingly, properties such as the resistance to traction of the threads according to the invention can be improved by a maturing phase (commencement of ageing) of the threads.

The glass threads sized according to the invention exhibit a loss on ignition which is advantageously less than 3% and, preferably, less than 2%. The small amount of size deposited on the thread substantially reduces the problems of the threads' adhering to one another, especially when they are collected in the form of rolls, and also improves the opening of the thread during impregnation with a material to be reinforced and is economically advantageous.

The glass threads obtained according to the invention may be in various forms which may or may not necessitate supplementary treatment(s) of the threads. The glass threads according to the invention may thus be in the form of continuous threads or cut threads and may have been assembled in the form of braiding, ribbons, mats or woven or non-woven meshes.

The composites advantageously obtained by associating glass threads according to the invention and at least one organic and/or inorganic material (the amount of glass within these composites generally being between 30 and 70% by weight) have good mechanical properties as illustrated hereinafter in the Examples.

Other advantages and features of the invention will become apparent in the light of the following Examples giving, by way of non-limiting illustration, sizing compositions according to the invention and characteristics of the threads coated with these compositions or characteristics of composites comprising the said threads.

EXAMPLE 1

Filaments 9 μm in diameter obtained by drawing thin streams of glass in accordance with the process of the Invention are coated with a size having the following composition expressed in percentages by weight:

| Components of the base system having a molecular mass of less than 750 | |
|---|---|
| mixture based on 3,4-epoxy-cyclohexylmethyl-3,4-epoxy-cyclohexanecarboxylate[1] | 34.0% |
| mixture based on monofunctional epoxide[2] | 31.5% |
| mixture based on cycloaliphatic difunctional epoxide[3] | 16.0% |
| Cationic photo-initiator: | |
| mixture of triarylsulphonium hexafluoroantimonate (50%) and propylene carbonate (50%)[4] | 4.0% |

| -continued | |
|---|---|
| Additives: | |
| gamma-methacryloxypropyltri-methoxysilane coupling agent[5] | 10.0% |
| ethylene glycol adipate textile agent[6] | 4.5% |

The sizing composition has a viscosity of $52.10^{-3}$ Pa·s (52 cP) at 25° C. The filaments are gathered into threads which are wound onto cops and subjected during winding to U.V. radiation emitted by a mercury vapour tube having a power of 120 watts per linear centimeter of tube, each layer of thread being exposed directly to the radiation for approximately 1 second.

The threads are then extracted from the cops in order to measure their tensile breaking strength under the conditions defined by ISO standard 3341. The results are indicated in the appended Comparative Table I which also gives the titre and the loss on ignition of the threads obtained.

Starting from the threads obtained, composite plates having parallel threads are produced in accordance with NF standard 57152. The reinforced resin is the polyester resin M 402 marketed under that reference by CIBA-GEIGY and to which are added, per 100 parts by weight of polyester resin, 20 parts of a softener marketed under the reference "F 8010 C" by CRAY-VALLEY, 16.5 parts of styrene and 1.5 parts of an accelerator marketed under the reference "THM 60" by CIBA-GEIGY.

The mechanical properties exhibited by these plates, in respect of flexing and shearing, are measured in accordance with the standards ISO 178 and ISO 4585, respectively. These properties are measured before ageing and after immersing the plates in water at 98° C. for 24 hours.

The results obtained on 8–10 specimens are indicated in the appended Comparative Table II giving the content by weight of glass in the plates produced, the type of resin used for the plates, the flexural breaking stress, for the above-mentioned content of glass and for a content of glass increased to 100%, before and after ageing, and the shear breaking stress before and after ageing. The standard deviations are indicated in brackets.

EXAMPLE 2

Starting from the threads obtained in Example 1, composite plates are produced as in Example 1, the reinforced resin this time being the epoxy resin CY 205 which is marketed under that reference by CIBA-GEIGY and to which there are added, per 100 parts by weight of epoxy resin, 32 parts by weight of a hardener marketed under the reference "HT 972" by CIBA-GEIGY.

The mechanical properties of the resulting plates are measured as described in Example 1, before ageing and after immersing the plates in water at 98° C., this time for 72 hours, and are indicated in the appended Comparative Table II.

EXAMPLE 3

Filaments obtained in accordance with the invention are coated with a size having the following composition (percentages by weight);

| Components of the base system having a molecular mass of less than 750 | |
|---|---|
| trimethylolpropane triglycidyl ether[7] | 35.0% |
| cresyl glycidyl ether[8] | 26.0% |
| 3,4-epoxycyclohexylmethyl-3,4-epoxycyclohexanecarboxylate[9] | 15.0% |
| Cationic photo-initiator: | |
| mixture of triarylsulphonium hexafluoroantimonate (50%) and propylene carbonate (50%)[4] | 4.0% |
| Additives: | |
| gamma-(dialkoxyphenyl)propyl-trimethoxysilane coupling agent[10] | 10.0% |
| α, ω-glycidyloxyalkylpolydimethyl-siloxane film-forming agent[11] | 10.0% |

The sizing composition in question has a viscosity of $64.10^{-3}$ Pa·s (64 cP) at 20° C. The filaments are gathered into threads which are then cut by a member used to draw them, the threads being collected on a moving conveyor and subjected on the said conveyor to ultraviolet radiation emitted by a mercury vapour tube having a power of 80 watts per linear centimeter of tube, the exposure time of each of the cut threads being of the order of 5 seconds.

The filament diameter of the threads obtained is 14 μm and their loss on ignition is 2% by weight.

EXAMPLE 4

Sized and irradiated threads are obtained in the same manner as in Example 1, except that the sizing composition used is the following (percentages by weight):

| Components of the base system having a molecular mass of less than 750 | |
|---|---|
| 1,2-epoxyhexandecane[12] | 20.0% |
| trimethylolpropane triglycidyl ether[7] | 25.0% |
| 3,4-epoxycyclohexylmethyl-3,4-epoxycyclohexanecarboxylate[9] | 18.0% |
| 1,4-cyclohexane dimethanol divinyl ether[13] | 20.0% |
| Cationic photo-initiator | |
| mixture of triarylsulphonium hexafluoroantimonate (50%) and propylene carbonate (50%)[4] | 4.0% |
| Additive | |
| gamma-methacryloxypropyltrimethoxysilane coupling agent[5] | 8.0% |
| isobutyl stearate textile agent | 5.0% |

The sizing composition has a viscosity of $40.10^{-3}$ Pa·s (40 cP) at 25° C.

The characteristics of the threads obtained are determined an in Example 1 and are indicated in Comparative Table I.

EXAMPLE 5

Sized and irradiated threads are obtained as in Example 1, except that the threads are wound for 1800 seconds on supports in such a manner as to give rolls called "cakes" and the sizing composition used is the following (percentages by weight):

| Components of the base system having a molecular mass of less than 750 | |
|---|---|
| 1,2-epoxyhexadecane[12] | 13.0% |
| mixture based on cycloaliphatic difunctional epoxide[3] | 20.0% |
| triethylene glycol divinyl ether[15] | 30.0% |
| Component of the base system having a molecular mass of greater than 750: | |
| castor oil polyglycidyl ether[14] | 20.0% |
| Cationic photo-initiator: | |
| mixture of triarylsulphonium hexafluoroantimonate (50%) and propylene carbonate (50)[4] | 4.0% |
| Additives: | |
| gamma-methacryloxypropyl-trimethoxysilane coupling agent[5] | 8.0% |
| ethylene glycol adipate textile agent[6] | 5.0% |

The sizing composition in question has a viscosity of $48.10^{-3}$ Pa·s (48 cP) at 22° C. The characteristics of the threads obtained are determined as in Example 1 and are indicated in Comparative Table 1.

Composite plates are produced in the same manner as in Example 2 and the mechanical properties of these plates, measured as in Example 2, are indicated in the appended Comparative Table II.

EXAMPLE 6

Sized and irradiated threads are obtained as in Example 1, except that the threads are wound for 1200 seconds on cakes and the sizing composition is the following (percentages by weight):

| Components of the base system having a molecular mass of less than 750 | |
|---|---|
| trimethylolpropane triglycidyl ether[7] | 20.0% |
| 3,4-epoxycyclohexylmethyl-3,4-epoxycyclohexanecarboxylate[9] | 25.0% |
| 1,2-epoxyhexadecane[12] | 16.0% |
| 1,6-hexanediol diacrylate[16] | 25.0% |
| Cationic photo-initiator: | |
| mixture of triarylsulphonium hexafluoroantimonate (50%) and propylene carbonate (50)[4] | 4.0% |
| Additive: | |
| polyethoxytrimethoxysilane coupling agent[17] | 10.0% |

The sizing composition has a viscosity of $52.10^{-3}$ Pa·s (52 cP) at 20° C. The characteristics of the threads obtained are determined as in Example 1 and are indicated in Comparative Table I.

Composite plates are produced from the resulting threads in the same manner as in Example 1 and the mechanical properties of these plates, measured as in Example 1, are indicated in Comparative Table II.

EXAMPLE 7

Composite plates are produced as in Example 2 from the threads obtained in Example 6 and the mechanical properties of these plates, measured under the same conditions as in Example 2, are indicated in Comparative Table II.

EXAMPLE 8

Sized and irradiated threads are obtained as in Example 1, except that the sizing composition is the following (percentages by weight):

| Components of the base system having a molecular mass of less than 750: | |
|---|---|
| trimethylolpropane triglycidyl ether[7] | 20.0% |
| 3,4-epoxycyclohexylmethyl-3,4-epoxycyclohexanecarboxylate[9] | 20.0% |
| triethylene glycol divinyl ether[15] | 15.0% |
| lauryl acrylate[18] | 13.0% |
| N-vinylpyrrolidone | 15.0% |
| Cationic photo-initiator: | |
| mixture of triarylsulphonium hexafluoroantimonate (50%) and propylene carbonate (50%)[4] | 4.0% |
| Additives: | |
| polyethoxytrimethoxysilane coupling agent | 8.0% |
| ethylene glycol adipate textile agent[6] | 5.0% |

The sizing composition has a viscosity of $44.10^{-3}$ Pa·s (44 cP) at 25° C. The characteristics of the threads obtained are determined as in Example 1 and are indicated in Comparative Table I.

Composite plates are produced as in Example 1 from the threads obtained and the mechanical properties of these plates, measured as in Example 1, are indicated in Comparative Table II.

EXAMPLE 9

Composite plates are produced as in Example 2 from the threads obtained in Example 8 and the mechanical properties of these plates, measured under the same conditions as in Example 2, are indicated in Comparative Table II.

COMPARATIVE EXAMPLE I

Sized and irradiated threads are obtained as in Example 1, except that the sizing composition is the following (percentages by weight):

| phenoxy acrylate[19] | 20.0% |
|---|---|
| acrylate ester[20] | 20.0% |
| triethoxytrimethylolpropane triacrylate[21] | 14.0% |
| silicone hexaacrylate[22] | 7.5% |
| N-vinylpyrrolidone | 20.0% |
| 1-hydroxycyclohexyl phenyl ketone free radical photo-initiator[23] | 10.0% |
| gamma-aminopropyltriethoxy-silane coupling agent[24] | 6.0% |
| ethylene glycol adipate textile agent[6] | 2.5% |

The sizing composition has a viscosity of $60.10^{-3}$ Pa·s (60 cP) at 20° C. The characteristics of the threads obtained are determined as in Example 1 and are indicated in Comparative Table I.

Composite plates are produced an in Example 2 from the threads obtained and the mechanical properties of these plates, measured as in Example 2, are indicated in Comparative Table II.

COMPARATIVE EXAMPLE II

Sized threads subjected to ultraviolet radiation are obtained in the same manner as in Example 6, except that the sizing composition used is the following (percentages by weight):

| diacrylate carbonate[25] | 14.5% |
|---|---|
| triethoxytrimethylolpropane triacrylate[21] | 19.0% |
| silicone hexaacrylate[22] | 14.5% |
| N-vinylpyrrolidone | 33.0% |
| 1-hydroxycyclohexyl phenyl ketone free radical photo-initiator[23] | 9.5% |
| polyethoxytrimethoxysilane coupling agent[17] | 5.0% |
| ethylene glycol adipate textile agent[6] | 4.5% |

The sizing composition has a viscosity of $40.10^{-3}$ Pa·s (40 cP) at 20° C. The characteristics of the threads obtained are determined as in Example 1 and are indicated in Comparative Table I.

Composite plates are produced as in Example 2 from the threads obtained and the mechanical properties of these plates, measured as in Example 2, are indicated in Comparative Table II.

It is observed in the various Examples above that threads coated with size according to the invention are easy to handle, exhibit a low lose on ignition and have good tensile strength properties. Remarkably and advantageously, the tensile strength properties of the threads coated with size according to the invention are improved after commencement of ageing in water.

The sized threads according to the invention enable composites to be obtained which have mechanical properties which are at least as good as, and even better than, those of composites obtained from threads coated with sizes containing solely components that react by the free radical method and free radical photo-initiators.

The glass threads according to the invention may be used for various applications, for example for textile applications, such as the manufacture of chains by warping, or directly for reinforcing applications, such as the reinforcement of organic materials (for example plastics materials) or inorganic materials (for example cementing materials) in order to obtain composite products.

| References: | | |
|---|---|---|
| (1) | Marketed under reference "UVR 6100" by UNION CARBIDE | |
| (2) | Marketed under reference "UVR 6200" by UNION CARBIDE | |
| (3) | Marketed under reference "UVR 6379" by UNION CARBIDE | |
| (4) | Marketed under reference "UVI 6974" by UNION CARBIDE | |
| (5) | Marketed under reference "Silquest A 174" by OSI | |
| (6) | Marketed under reference "Uraplast S 5 672" by DSM | |
| (7) | Marketed under reference "Heloxy 5048" by SHELL | |
| (8) | Marketed under reference "Heloxy 62" by SHELL | |
| (9) | Marketed under reference "UVR 6110" by UNION CARBIDE | |
| (10) | Marketed under reference "Silquest A 11648" by OSI | |
| (11) | Marketed under reference "Tego SI 2130" by GOLDSCHMIDT | |
| (12) | Marketed under reference "UVR 6216" by UNION CARBIDE | |

| | References: |
|---|---|
| (13) | Marketed under reference "CHVE" by INTERNATIONAL SPECIALITY PRODUCTS |
| (14) | Marketed under reference "Helozy 505" by SHELL |
| (15) | Marketed under reference "DVE 3" by INTERNATIONAL SPECIALTY PRODUCTS |
| (16) | Marketed under reference "HDDA" by UNION CHIMIQUE BELGE |
| (17) | Marketed under reference "Silquest A 1230" by OSI |
| (18) | Marketed under reference "SR 335" by CRAY-VALLEY |
| (19) | Marketed under reference "SR 339" by CRAY-VALLEY |
| (20) | Marketed under reference "SR 491" by CRAY-VALLEY |
| (21) | Marketed under reference "SR 454" by CRAY-VALLEY |
| (22) | Marketed under reference "Ebecryl 1360" by UNION CHIMIQUE BELGE |
| (23) | Marketed under reference "Irgacure 184" by CIBA-GEIGY |
| (24) | Marketed under reference "Silquest A 1100" by OSI |
| (25) | Marketed under reference "CL 993" by AKCROS |

COMPARATIVE TABLE I

| | Ex. 1 | Ex. 4 | Ex. 5 | Ex. 6 | Ex. 8 | Comp. Ex. I | Comp. Ex. II |
|---|---|---|---|---|---|---|---|
| Titre (tex) | 70.7 | 70.6 | 67.5 | 70.6 | 67.2 | 68.8 | 70.4 |
| Loss on ignition (%) | 0.9 | 1.2 | 1.1 | 1.3 | 1.1 | 1.3 | 1.1 |
| Tensile breaking force (N) | 42.90 | 33.74 | 33.93 | 42.90 | 39.52 | 31.38 | 36.77 |

COMPARATIVE TABLE II

| | Ex. 1 | Ex. 2 | Ex. 5 | Ex. 6 | Ex. 7 | Ex. 8 | Ex. 9 | Comp. Ex. I | Comp. Ex. II |
|---|---|---|---|---|---|---|---|---|---|
| Amount of glass (%) | 70.00 | 67.11 | 71.73 | 71.20 | 70.89 | 70.23 | 69.26 | 68.20 | 70.20 |
| Resin used | polyester | epoxy | epoxy | polyester | epoxy | polyester | epoxy | epoxy | epoxy |
| Flexural breaking Stress (MPa) | | | | | | | | | |
| *before ageing | 1184 | 1068 | 1129 | 1175 | 1131 | 1145 | 1087 | 941 | 999 |
| σ | (39) | — | (30) | (49) | (17) | (41) | — | (22) | (24) |
| *after ageing | 787 | 804 | 787 | 746 | 814 | 689 | 668 | 792 | 374 |
| σ | (13) | — | (13) | (23) | (23) | (17) | — | (12) | (6) |
| Flexural breaking Stress for 100% of glass (MPa) | | | | | | | | | |
| *before ageing | 2247 | 2063 | 2029 | 2175 | 2069 | 2163 | 2036 | 1822 | 1854 |
| σ | (74) | — | (54) | (91) | (31) | (77) | — | (43) | (45) |
| *after ageing | 1494 | 1554 | 1414 | 1381 | 1489 | 1302 | 1250 | 1533 | 694 |
| σ | (25) | — | (23) | (43) | (42) | (32) | — | (24) | (11) |
| Shear breaking Stress (MPa) | | | | | | | | | |
| *before ageing | 69.0 | 65.5 | 70.3 | 64.0 | 67.8 | 64.5 | 68.0 | 52.2 | 55.6 |
| σ | (0.7) | — | (1.1) | (0.5) | (1.0) | (0.7) | — | (1.0) | (0.9) |
| *after ageing | 33.6 | 48.4 | 40.8 | 29.0 | 43.1 | 28.7 | 47.0 | 42.0 | — |
| σ | (0.4) | — | (1.3) | (0.7) | (0.7) | (0.4) | — | (0.4) | — |

I claim:

1. Sizing composition for glass threads, which comprises a solution of a viscosity of less than or equal to 400 cP containing less than 5% by weight of solvent and containing at least one base system which can be polymerised and/or crosslinked under the action of ultraviolet radiation or an electron beam, the said base system comprising at least one component that has a molecular mass of less than 750 and that has at least one reactive epoxy group and comprising at least 60% by weight of one or more components that have a molecular mass of less than 750 and that have at least one reactive group selected from the following groups: epoxy, hydroxy, vinyl, acrylic and methacrylic.

2. Composite comprising at least one organic and/or inorganic material and sized glass threads, characterized in that it comprises, at least in part, glass threads sized with a composition according to claim 1.

* * * * *

UNITED STATES PATENT AND TRADEMARK OFFICE
CERTIFICATE OF CORRECTION

PATENT NO.    : 6,090,487
DATED         : July 18, 2000
INVENTOR(S)   : Patrick Moireau It is certified that error appears in the above-identified patent and that said Letters Patent is hereby corrected as shown below:

Column 18,
Line 62, "vinyl" should read -- vinyl ether --.

Signed and Sealed this

Third Day of December, 2002

JAMES E. ROGAN
*Director of the United States Patent and Trademark Office*